United States Patent
Katakawa

(10) Patent No.: US 8,825,756 B2
(45) Date of Patent: Sep. 2, 2014

(54) SERVER APPARATUS, INFORMATION PROCESSING METHOD, INFORMATION PROCESSING PROGRAM, AND RECORDING MEDIUM

(75) Inventor: Jun Katakawa, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 97 days.

(21) Appl. No.: 13/702,353

(22) PCT Filed: Nov. 28, 2011

(86) PCT No.: PCT/JP2011/077372
§ 371 (c)(1),
(2), (4) Date: Dec. 6, 2012

(87) PCT Pub. No.: WO2012/073884
PCT Pub. Date: Jun. 7, 2012

(65) Prior Publication Data
US 2013/0080926 A1 Mar. 28, 2013

(30) Foreign Application Priority Data
Dec. 3, 2010 (JP) .................................. 2010-270929

(51) Int. Cl.
*G06F 15/16* (2006.01)
*G06F 3/01* (2006.01)
*G06Q 30/02* (2012.01)

(52) U.S. Cl.
CPC . *G06F 3/01* (2013.01); *G06Q 30/02* (2013.01)
USPC ........................................................ 709/203

(58) Field of Classification Search
CPC ............................ H04L 67/10; H04L 67/1095
USPC ........................................................ 709/203
See application file for complete search history.

(56) References Cited

U.S. PATENT DOCUMENTS

| | | | |
|---|---|---|---|
| 2005/0075938 A1* | 4/2005 | Mukai et al. | 705/24 |
| 2006/0277482 A1* | 12/2006 | Hoffman et al. | 715/764 |
| 2011/0047596 A1* | 2/2011 | Miller | 726/3 |
| 2011/0161440 A1* | 6/2011 | Juvet et al. | 709/206 |

FOREIGN PATENT DOCUMENTS

| | | |
|---|---|---|
| JP | 2000-57065 A | 2/2000 |
| JP | 2001-229227 A | 8/2001 |
| JP | 2002-15219 A | 1/2002 |
| JP | 2002-334179 A | 11/2002 |

OTHER PUBLICATIONS

International Search Report for PCT/JP2011/077372 dated Dec. 27, 2011.

* cited by examiner

*Primary Examiner* — Jason Recek
(74) *Attorney, Agent, or Firm* — Sughrue Mion, PLLC

(57) ABSTRACT

When an input area corresponding to a first service is displayed by the terminal apparatus, every time a user inputs a character into the input area, character information indicating the input character is received from the terminal apparatus. The character information is stored in a storage means included in a server apparatus different from a server apparatus of the first service and different from a server apparatus of a second service. Request information indicating a request to display an input area corresponding to the second service is received from the terminal apparatus. Instruction information, which indicates an instruction to display the input area corresponding to the request information which includes the character information stored in the storage means as character information indicating one or more characters previously input into the input area displayed by the terminal apparatus on the basis of the instruction information, is transmitted to the terminal apparatus.

4 Claims, 9 Drawing Sheets

FIG.4A
MEMBER INFORMATION DB

| |
|---|
| USER ID |
| PASSWORD |
| USER NAME |
| BIRTH DATE |
| GENDER |
| ADDRESS |
| TELEPHONE NUMBER |
| E-MAIL ADDRESS |
| . . . |

FIG.4B
SALE ITEM INFORMATION DB

| |
|---|
| SALE ITEM ID |
| SALE ITEM NAME |
| PRICE |
| NORMAL URL OF SALE ITEM DETAIL PAGE |
| SHORT URL OF SALE ITEM DETAIL PAGE |
| URL OF SALE ITEM IMAGE |
| EXPLANATORY TEXT |
| . . . |

FIG.4C
CGM SITE INFORMATION DB

| |
|---|
| SITE ID |
| TITLE INPUT FLAG |
| UPPER LIMIT OF THE NUMBER OF INPUT CHARACTERS |
| POSTING INFORMATION INPUT WINDOW DATA |

FIG.4D
TEMPORARY STORAGE DB

| |
|---|
| USER ID |
| SALE ITEM ID |
| TITLE INPUT TEXT |
| BODY INPUT TEXT |
| THE LATEST INPUT TIME |

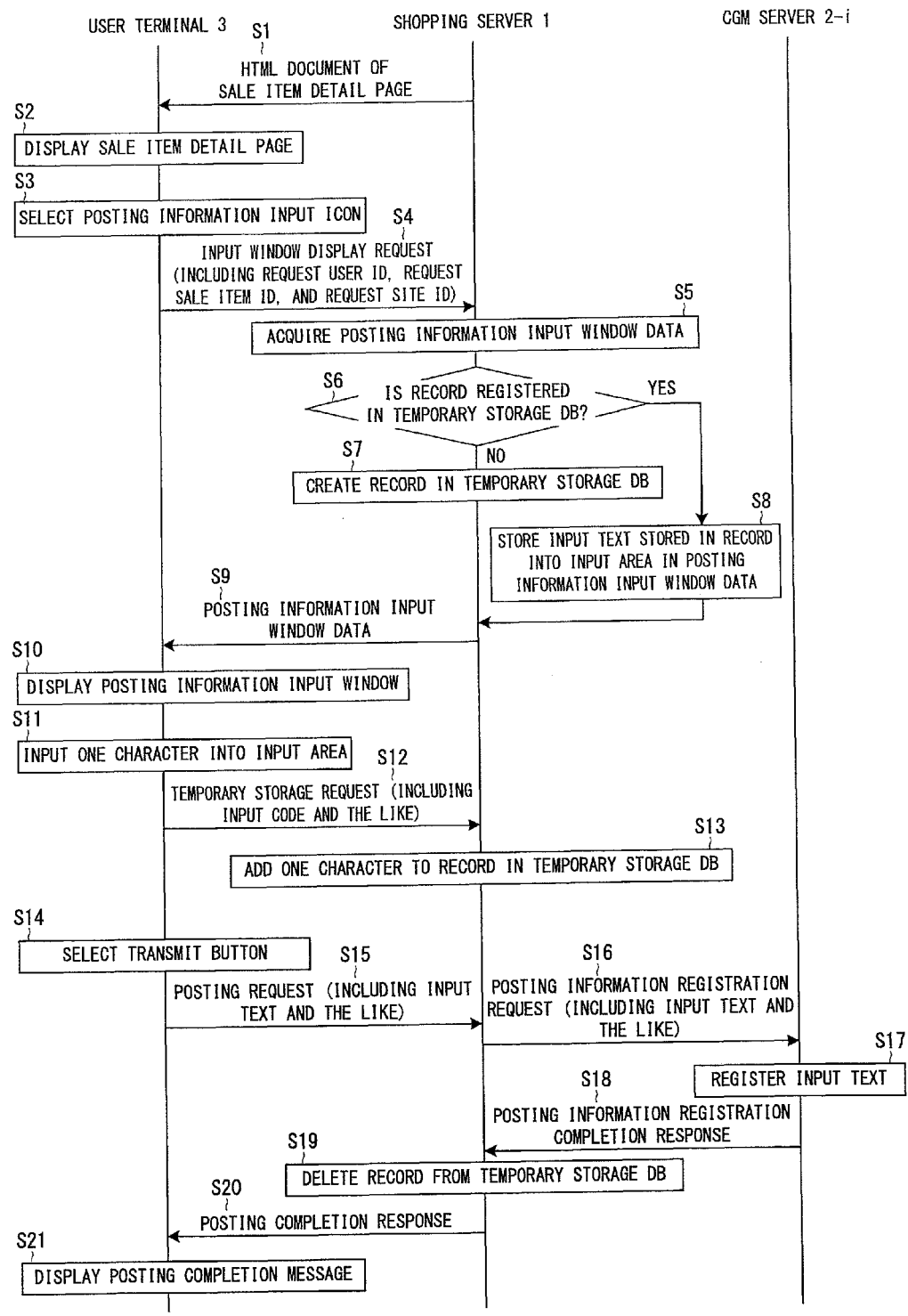

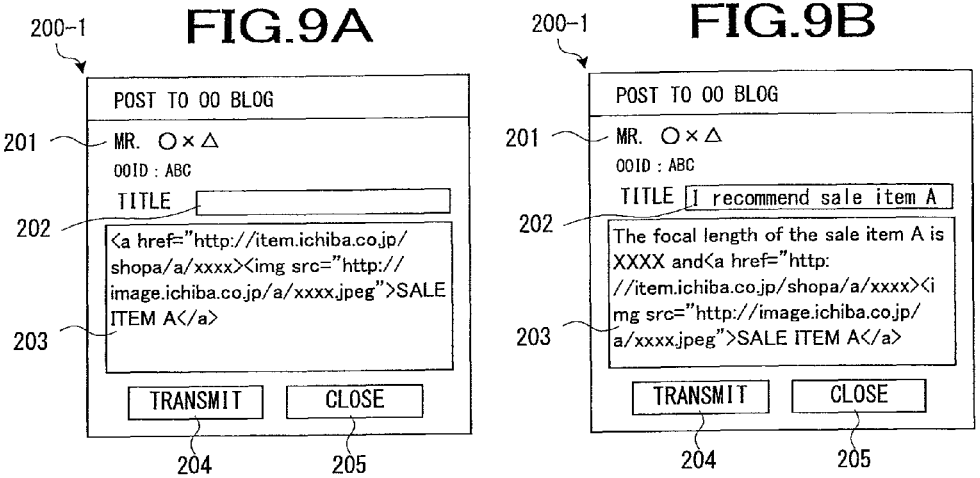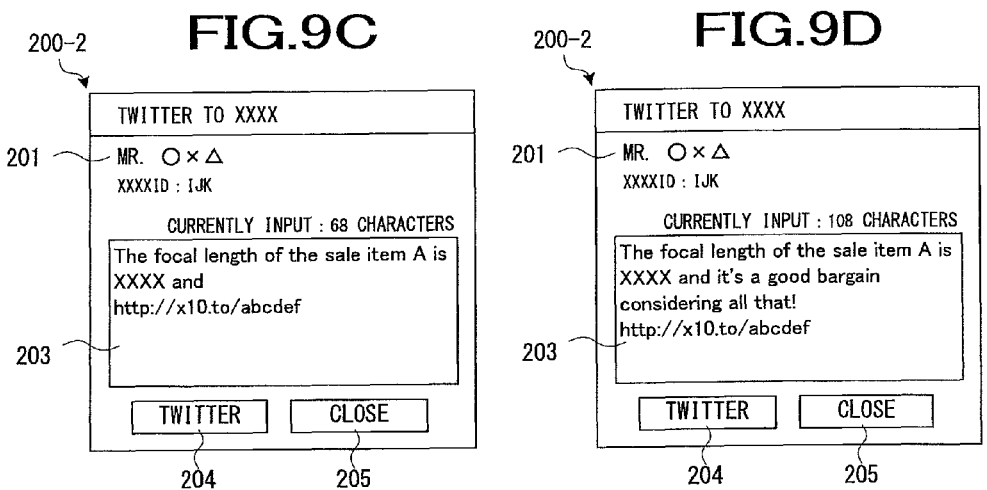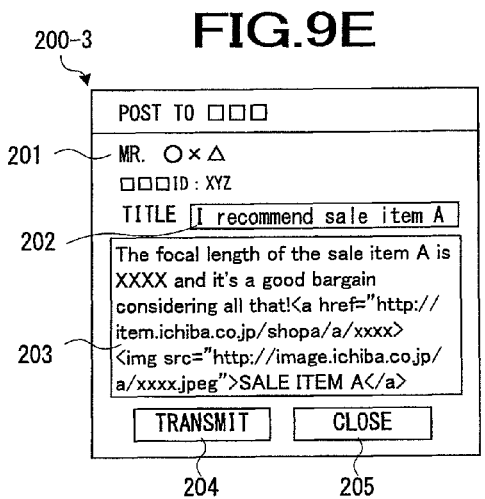

SERVER APPARATUS, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2011/077372 filed Nov. 28, 2011, claiming priority based on Japanese Patent Application No. 2010-270929 filed Dec. 3, 2010, the contents of all of which are incorporated herein by reference in their entirety.

TECHNICAL FIELD

The present invention relates to a technical field of a server apparatus and an information processing method for causing a terminal apparatus to display an input area into which a user inputs information to be posted in a service in which information posted from the user can be browsed by other users.

BACKGROUND ART

Conventionally, a service in which information posted from a user can be browsed by other users (hereinafter referred to as "posting information publishing service") is known. An example of the posting information publishing service is a CGM (Consumer Generated Media) service such as a blog, a mini-blog, and SNS (Social Network Service). In the posting information publishing service, for example, a user can recommend an item for sale, which the user found on the Internet, to other users. In this case, the user inputs a sentence to be posted in an input area displayed based on an HTML (HyperText Markup Language) document or the like on a screen of a terminal apparatus. For example, Patent Literature 1 describes that a user inputs a message or the like introducing an item for sale in an input field in an introduction input form screen displayed on a screen.

CITATION LIST

Patent Literature

Patent Literature 1: Japanese Patent Application Laid-Open No. 2002-15219

SUMMARY OF INVENTION

Technical Problem

However, the technique described in Patent Literature 1 does not consider a case in which there are a plurality of posting information publishing services that can be selected as a posting destination. Therefore, it takes time when a user posts information, which the user is inputting to post the information to a certain posting information publishing service, to another posting information publishing service.

Specifically, the user makes a screen for posting information to a certain posting information publishing service displayed. Then, the user inputs information into an input area in the screen. Here, for example, the user changes his or her mind and decides to post the information to another posting information publishing service. Therefore, the user makes a screen for posting information to the other posting information publishing service displayed. At this time, there is no input information in an input area in the newly displayed screen. Therefore, the user has to input the previously input information into the input area again.

The present invention is made in view of the above problem, and an object of the present invention is to provide a server apparatus, an information processing method, an information processing program, and a recording medium, which can transfer information input into an input area for posting information to a certain service to an input area for posting information to another service.

Solution to Problem

In order to achieve the above object, the invention according to claim 1 relates to a server apparatus to which a terminal apparatus that displays an input area, into which information to be posted to a service in which information posted from a user can be browsed by other users is input by characters, can be connected via a network, the server apparatus comprising:

a character information receiving means that receives character information indicating an input character from the terminal apparatus every time the user inputs the character into the input area when the input area corresponding to a first service which is one of a plurality of the services is displayed by the terminal apparatus;

a storage control means that stores the character information received by the character information receiving means in a storage means included in a server apparatus different from a server apparatus of the first service and different from a server apparatus of a second service which is one of the plurality of the services and is different from the first service;

a request information receiving means that receives request information indicating a request to display the input area corresponding to the second service from the terminal apparatus; and a transmitting means that transmits instruction information, which indicates an instruction to display the input area corresponding to the request information received by the request information receiving means and which includes the character information stored in the storage means as character information indicating characters previously input into the input area displayed by the terminal apparatus on the basis of the instruction information, to the terminal apparatus.

According to the present invention, when a user, who inputs at least a part of information to be posted to a first service into an input area corresponding to the first service, makes an input area corresponding to a second service to be displayed on a terminal apparatus, the information input so far is already input into the newly displayed input area. Therefore, input information which the user intends to post to a certain service can be transferred to an input area for posting information to another service.

The invention according to claim 2 relates to the server apparatus according to claim 1, further comprising:

a first identification information receiving means that receives identification information for identifying a thing corresponding to thing information which relates to one of a plurality things and which is displayed by the terminal apparatus when the input area corresponding to the first service is displayed; and a second identification information receiving means that receives identification information for identifying a thing corresponding to the thing information, which is displayed by the terminal apparatus when the request information is transmitted from the terminal apparatus, from the terminal apparatus, wherein the storage means associates the character information received by the character information receiving means with the identification information received by the first identification information receiving means and stores the character information in the storage means, and the transmitting means transmits the instruction information including the character information corresponding to the identification information received by the second identification information receiving means to the terminal apparatus.

According to the present invention, when a thing corresponding to information displayed when the input area corresponding to the first service is displayed and a thing corresponding to information displayed when the input area corresponding to the second service is displayed are different from each other, the information input so far is not input into the newly displayed input area. Therefore, when the user sees information displayed related to a thing and posts information related to the thing, it is possible not to transfer the input information when the user posts information related to a thing which is different from a thing for which the user intended to post information to a certain service, to another service.

The invention according to claim 3 relates to an information processing method in a server apparatus to which a terminal apparatus that displays an input area, into which information to be posted to a service in which information posted from a user can be browsed by other users is input by characters, can be connected via a network, the information processing method comprising:

a character information receiving step of receiving character information indicating an input character from the terminal apparatus every time the user inputs the character into the input area when the input area corresponding to a first service which is one of a plurality of the services is displayed by the terminal apparatus;

a storage step of storing the character information received in the character information receiving step in storage means included in a server apparatus different from a server apparatus of the first service and different from a server apparatus of a second service which is one of the plurality of the services and is different from the first service;

a request information receiving step of receiving request information indicating a request to display the input area corresponding to the second service from the terminal apparatus; and a transmitting step of transmitting instruction information, which indicates an instruction to display the input area corresponding to the request information received in the request information receiving step and which includes the character information stored in the storage means as character information indicating characters previously input into the input area displayed by the terminal apparatus on the basis of the instruction information, to the terminal apparatus.

The invention according to claim 4 relates to an information processing program causing a computer included in a server apparatus to which a terminal apparatus that displays an input area, into which information to be posted to a service in which information posted from a user can be browsed by other users is input by characters, can be connected via a network to function as:

character information receiving means that receives character information indicating an input character from the terminal apparatus every time the user inputs the character into the input area when the input area corresponding to a first service which is one of a plurality of the services is displayed by the terminal apparatus;

storage control means that stores the character information received by the character information receiving means in storage means included in a server apparatus different from a server apparatus of the first service and different from a server apparatus of a second service which is one of the plurality of the services and is different from the first service;

request information receiving means that receives request information indicating a request to display the input area corresponding to the second service from the terminal apparatus; and transmitting means that transmits instruction information, which indicates an instruction to display the input area corresponding to the request information received by the request information receiving means and which includes the character information stored in the storage means as character information indicating characters previously input into the input area displayed by the terminal apparatus on the basis of the instruction information, to the terminal apparatus.

The invention according to claim 5 relates to a recording medium that computer-readably stores an information processing program that causes a computer included in a server apparatus to which a terminal apparatus that displays an input area, into which information to be posted to a service in which information posted from a user can be browsed by other users is input by characters, can be connected via a network to function as:

character information receiving means that receives character information indicating an input character from the terminal apparatus every time the user inputs the character into the input area when the input area corresponding to a first service which is one of a plurality of the services is displayed by the terminal apparatus;

storage control means that stores the character information received by the character information receiving means in storage means included in a server apparatus different from a server apparatus of the first service and different from a server apparatus of a second service which is one of the plurality of the services and is different from the first service;

request information receiving means that receives request information indicating a request to display the input area corresponding to the second service from the terminal apparatus; and transmitting means that transmits instruction information, which indicates an instruction to display the input area corresponding to the request information received by the request information receiving means and which includes the character information stored in the storage means as character information indicating characters previously input into the input area displayed by the terminal apparatus on the basis of the instruction information, to the terminal apparatus.

Advantageous Effects of Invention

According to the present invention, input information which the user intends to post to a certain service can be transferred to an input area for posting information to another service.

BRIEF DESCRIPTION OF DRAWINGS

FIG. 4A is a diagram showing an example of information registered in a member information DB 12a according to an embodiment. FIG. 4B is a diagram showing an example of information registered in a sale item information DB 12b according to an embodiment. FIG. 4C is a diagram showing an example of information registered in a CGM site information DB 12c according to an embodiment. FIG. 4D is a diagram showing an example of information registered in a temporary storage DB 12d according to an embodiment.

FIG. 5 is a sequence diagram showing a process example of the CGM system S according to an embodiment.

FIGS. 9A to 9E are screen display examples of a posting information input window 200-i according to an example.

DESCRIPTION OF EMBODIMENT

Hereinafter, an embodiment of the present invention will be described in detail with reference to the drawings. The embodiment described below is an embodiment in which the present invention is applied to a CGM system.

1. Configuration and Function Outline of CGM System

Figure 1:
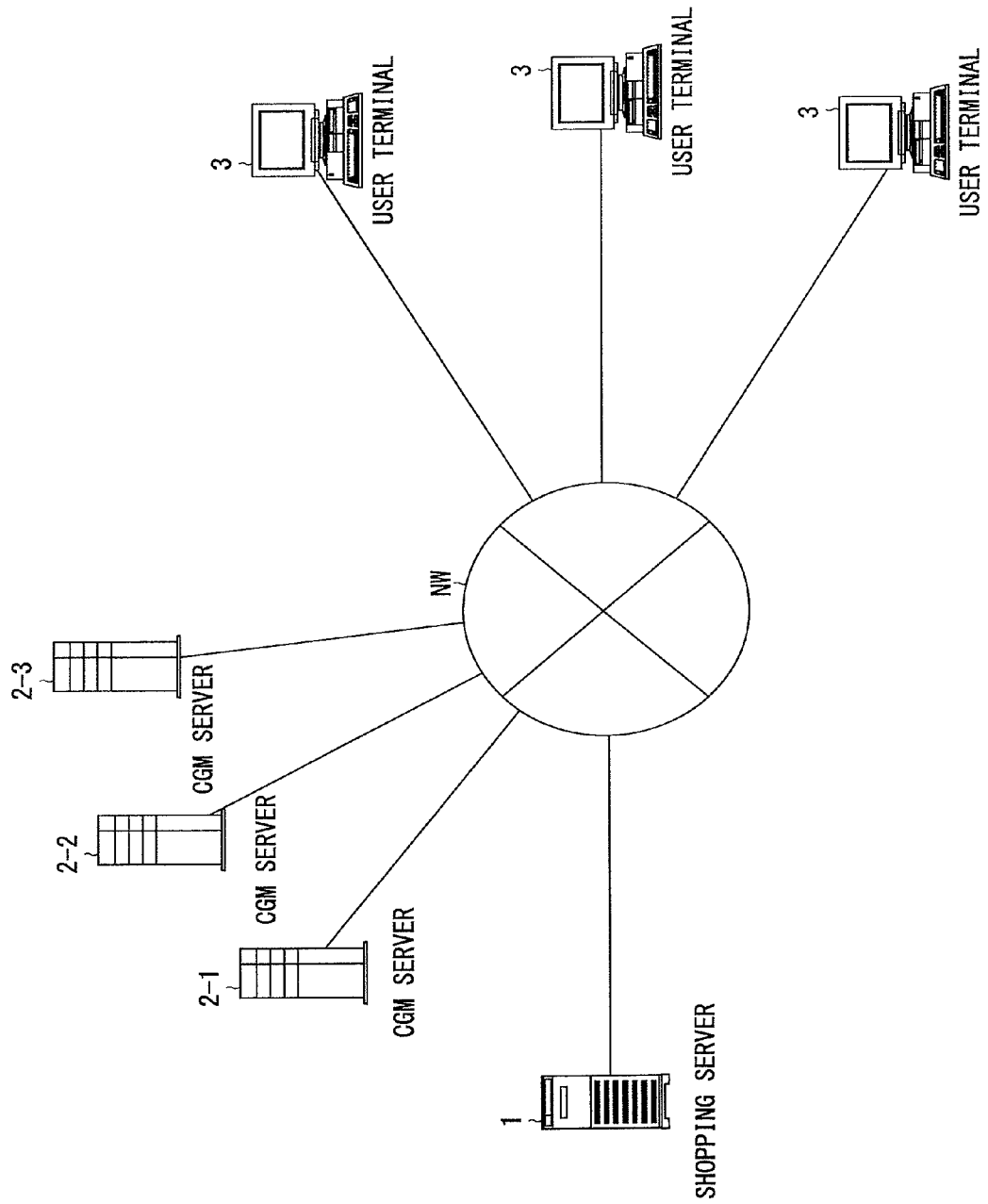
FIG. 1 is a diagram showing an example of a schematic configuration of a CGM system S according to an embodiment.

First, a configuration and a function outline of a CGM system S according to the present embodiment will be described with reference to FIG. 1. FIG. 1 is a diagram showing an example of a schematic configuration of a CGM system S according to the present embodiment.

As shown in FIG. 1, the CGM system S includes a shopping server 1 (an example of a server apparatus of the present invention), a plurality of CGM servers 2-i (i=1, 2, 3, and soon), and a plurality of user terminals 3 (examples of terminal apparatuses of the present invention). The shopping server 1, the CGM servers 2-i, and the user terminals 3 can transmit and receive data to and from each other via a network NW using, for example, TCP/IP as a communication protocol. The network NW is constructed by, for example, the Internet, a dedicated communication line (for example, CATV (Community Antenna Television) line), a mobile communication network (including base stations), gateways, and the like.

The shopping serve 1 is a server apparatus that performs various processes related to shopping sites. The shopping site is a Web site of electronic commerce from which users of the user terminals 3 can purchase various sale items (examples of things of the present invention). For example, the shopping server 1 transmits a Web page of a shopping site and performs processing related to search and purchase of a sale item according to a request from the user terminal 3.

The CGM servers 2-i are server apparatuses that perform various processing related to CGM sites i respectively. The CGM servers 2-i are server apparatuses different from the shopping serve 1. The CGM sites i are Web sites which provide their respective CGM services (examples of services of the present invention). Examples of the CGM sites i are a blog site, a mini-blog site, an SNS, an electronic bulletin board, a word of mouth site, a review site, and the like. For example, the CGM server 2-i registers information posted from a user (hereinafter referred to as "posting information") in a database and transmits a Web page that displays the posting information registered in the database according to a request from the user terminal 3. For example, the database is included in the CGM server 2-i. In this case, the CGM server 2-i stores information posted to the CGM service of the CGM site i.

The user terminal 3 is a terminal apparatus of a user who uses a shopping site, the CGM site i, and the like. The user terminal 3 accesses the shopping server 1, the CGM server 2-i, and the like according to an operation from the user. Thereby, the user terminal 3 receives a Web page from the server accessed by the user terminal 3 and displays the Web page. Software such as a browser and an e-mail client is embedded in the user terminal 3. As the user terminal 3, for example, a personal computer, a portable information terminal such as a PDA (Personal Digital Assistant) and a smartphone, and a mobile phone are used.

In the CGM system S having a configuration described above, the shopping server 1 makes the user be able to easily post information recommending a sale item that can be purchased on the shopping site to the CGM site i as the posting information.

There are sale item detail pages on which detailed information of the sale items (examples of thing information of the present invention) are displayed as Web pages of the shopping site. The user selects a CGM site i to which the user wants to post information for the sale item corresponding to the information displayed on the sale item detail page. Then, the shopping server 1 causes the user terminal 3 to display a posting information input window 200-i which is a window including an input area into which posting information that is posted to the selected CGM site i is input by characters.

The shopping server 1 performs a process to post the posting information input from the user into the input area displayed in the posting information input window 200-i to the CGM site i on behalf of the user terminal 3. To do so, the shopping server 1 uses an API (Application Programming Interface) provided by the CGM server 2-i for posting information. In order to use the API, the shopping server 1 uses, for example, OAuth. The OAuth is one of mechanisms to receive a permission to use an API. By using the OAuth, the shopping server 1 need not acquire information such as a password of the user in the CGM site i when using the API. Here, each CGM server 2-i that provides an API is referred to as a service provider. On the other hand, the shopping server 1 that uses the API is referred to as a consumer. The shopping server 1 registers itself with each CGM server 2-i as a consumer. The OAuth is publicly known, so that the detailed description of the mechanism of the OAuth will be omitted.

The shopping server 1 transfers information which a user inputs into the input area of the posting information input window 200-i corresponding to a certain CGM site i to the input area of the posting information input window 200-i corresponding to another certain CGM site i.

Figure 2A:
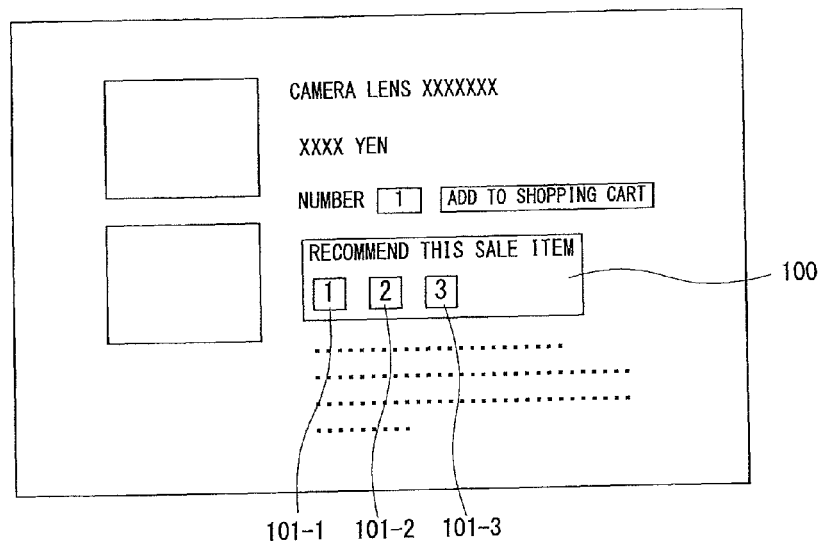
FIG. 2A is a screen display example of a sale item detail page.

FIG. 2A is a screen display example of the sale item detail page. In the sale item detail page, a sale item name, a price of the sale item, a sale item image, an explanatory text of the sale item, a button to order the sale item, and the like are displayed. Further, a posting information input icon display area 100 is displayed in the sale item detail page.

A plurality of posting information input icons 101-i are displayed in the posting information input icon display area 100. The posting information input icon 101-i is an icon for displaying the posting information input window 200-i. The posting information input icons 101-*i*, the number of which is the same as that of the CGM sites i predetermined to be sites whose API is used by the shopping server 1 to post information, are displayed. For example, when the posting information input icon 101-1 is selected by a user, the posting information input window 200-1 corresponding to the CGM site 1 is displayed. When the posting information input icon 101-2 is selected by the user, the posting information input window 200-2 corresponding to the CGM site 2 is displayed. Items that can be input as the posting information, the upper limit of the number of input characters, and the like are different for each CGM site i. Therefore, each CGM site i requires corresponding posting information input window 200-*i*. The number of the CGM sites i whose API is used by the shopping server 1 to post information is arbitrarily determined by an administrator of the shopping server 1.

The posting information input window 200-*i* is displayed on the sale item detail page. Therefore, the user can input posting information into the input area in the posting information input window 200-*i* while seeing information displayed on the sale item detail page.

Figure 2B:
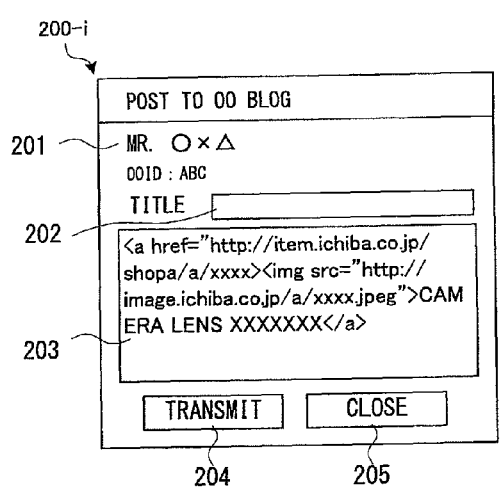
FIG. 2B is an example of a screen display of a posting information input window 200-$i$.

FIG. 2B is an example of a screen display of the posting information input window 200-*i*. The posting information input window 200-*i* is a posting information input window 200-*i* which corresponds to a CGM site i in which a title and a body text exist as items that can be input. Further, the posting information input window 200-*i* is a posting information input window 200-*i* which corresponds to a CGM site i in which the upper limit of the number of input characters is greater than a predetermined threshold value.

In the posting information input window 200-*i* shown in FIG. 2B, a user name 201, a title input area 202, a body text input area 203, a transmit button 204, a close button 205, and the like are displayed. The user name 201 is a user name of the user who posts information. The title input area 202 is an input area into which a title of the posting information is input. The body text input area 203 is an input area into which a body text of the posting information is input. In the body text input area 203, a tag indicating a hyper link (hereinafter referred to as "link") to the displayed sale item detail page is input in advance. The tag includes, for example, an a tag in which a URL (Uniform Resource Locator) of the sale item detail page is put, an img tag in which a URL of a sale item image is put, the sale item name, and the like. It is assumed that a body text including the tag is posted to the CGM site i as the posting information and the posting information is published on the Web page of the CGM site i. Then, on the Web page of the CGM site i, an image link indicating the sale item image and a character link indicating the sale item name are displayed along with the body text input by the user. These links are links to the sale item detail page. Therefore, a user who browses the posting information can browse the sale item detail page of the introduced sale item by selecting the displayed image link or the character link. The transmit button 204 is a button to post the information input into the input area to the CGM site i. The close button 205 is a button to delete the posting information input window 200-*i* from the screen.

Figure 2C:
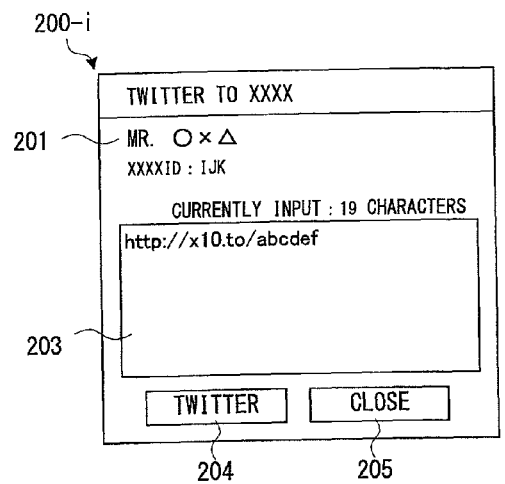
FIG. 2C is another example of a screen display of the posting information input window 200-$i$.

FIG. 2C is another example of a screen display of the posting information input window 200-*i*. In FIG. 2C, the components which are the same as those in FIG. 2B are denoted by the same reference signs. The posting information input window 200-*i* is a posting information input window 200-*i* which corresponds to a CGM site i in which only a body text exits as an item that can be input. Further, the posting information input window 200-*i* is a posting information input window 200-*i* which corresponds to a CGM site i in which the upper limit of the number of input characters is smaller than or equal to a predetermined threshold value.

In the posting information input window 200-*i* shown in FIG. 2C, a user name 201, a body text input area 203, a transmit button 204, a close button 205, and the like are displayed. In the body text input area 203, a short URL of the displayed sale item detail page is input in advance. The short URL is an alias of the URL of the sale item detail page. On the other hand, the original URL of the sale item detail page is referred to as a "normal URL" for being distinguished from the short URL. The character string length of the short URL is shorter than that of the normal URL. When a posting information including the short URL is posted to the CGM site i, a character link indicating the short URL of the sale item detail page is displayed on the Web page of the CGM site i. A user who browses the posting information can browse the sale item detail page of the introduced sale item by selecting the displayed character link. For example, when the CGM server 2-*i* generates an HTML document of the Web page on which the posting information is displayed, the CGM server 2-*i* converts the short URL into the character link.

The normal URL of the Web page includes a domain name that indicates the shopping server 1 and a path name of the HTML document that constitutes the Web page. For example, a path name of data indicates an absolute path of a position at which the data is stored in the file system of the CGM server 2-*i*. When the URL of the sale item detail page is long, the number of input characters easily exceeds the upper limit of the number of input characters in a CGM site i in which the upper limit is low. When characters, such as the tag that indicates the link to the sale item detail page described above, other than the URL of the sale item detail page are input into the body text input area 203, the number of input characters more easily exceeds the upper limit. Thereby, the user may not post information or the input information may be registered in the CGM site i in a state in which the input information is cut off in the middle. Therefore, with regard to a CGM site i in which the upper limit of the number of input characters is smaller than or equal to a predetermined threshold value, the shopping server 1 generates a state in which the short URL having a character string length shorter than that of the normal URL is input in advance.

As the short URL, for example, "http://x10.to/abcdef" is set. Here, "x10.to" is an alias of the domain name indicating the shopping server 1. The alias is shorter than the original domain name of the shopping server 1. "abcdef" is a character string for identifying the sale item detail page. The length of the character string is fixed. A different character sting is set for each sale item. One short URL may be assigned to each sale item or a plurality of short URLs may be assigned to each sale item.

The tag or the short URL, which indicates a link to the sale item detail page, input in the body text input area 203 in advance can be deleted from the body text input area 203 by an input operation of the user.

Next, the transfer of the information input in the input area of the posting information input window 200-*i* will be described with reference to an example. On the screen of the user terminal 3, for example, the sale item detail page of a sale item A is displayed, and at the same time, for example, the posting information input window 200-1 corresponding to the CGM site 1 is displayed. Then, the user inputs characters into the title input area 202 and the body text input area 203 of the displayed posting information input window 200-1. The title input area 202 and the body text input area 203 of the posting information input window 200-1 are examples of input areas corresponding to a first service of the present invention respectively.

Thereafter, the user does not select the transmit button 204 of the posting information input window 200-1, but selects the posting information input icon 101-2 corresponding to the CGM site 2. Then, the posting information input window 200-2 corresponding to the CGM site 2 is displayed.

If the user does not select the close button 205 of the posting information input window 200-1 before selecting the posting information input icon 101-2, the posting information input window 200-1 is still displayed. At this time, if the user selects the posting information input icon 101-2, the posting information input window 200-2 is displayed, and at the same time, the posting information input window 200-1 is deleted from the screen.

The information input into the title input area 202 and the body text input area 203 of the posting information input window 200-1 are displayed in the title input area 202 and the body text input area 203 of the posting information input window 200-2. In other words, the information input into the title input area 202 and the body text input area 203 of the posting information input window 200-i which is displayed so far is transferred to the title input area 202 and the body text input area 203 of the posting information input window 200-i which is newly displayed. Thereby, it is possible to save the user the trouble of inputting the same information again. The title input area 202 and the body text input area 203 of the posting information input window 200-2 are examples of input areas corresponding to a second service of the present invention respectively.

However, if the posting information input window 200-2 which is newly displayed does not include the title input area 202, the title is not transferred.

If the user inputs nothing in the title input area 202 of the posting information input window 200-1, the shopping server 1 generates a state in which a sale item name included in the sale item detail page of the sale item A is input into the title input area 202 of the posting information input window 200-2 in advance. Thereby, it is possible to save the user the trouble of inputting the title.

If the tag of a link to the sale item detail page or the short URL is input into the body text input area 203 of the posting information input window 200-1, the shopping server 1 performs conversion between the tag of the link and the short URL according to the upper limit of the number of input characters in the CGM site 2. The reason why the tag of the link to the sale item detail page is converted into the short URL is to prevent the number of input characters from easily exceeding the upper limit in a CGM site i in which the upper limit of the number of input characters is low as described above. The reason why the short URL is converted into the tag of the link to the sale item detail page is described below. The reason is because what sale item the posting information is for is more easily understood when the sale item image, the sale item name, and the URL indicating the shopping server are displayed as parts of the posting information in the Web page of the CGM site than when the short URL is displayed.

For example, after the user operates so that the sale item detail page of a sale item B different from the sale item A is displayed, if the user selects the posting information input icon 101-2 in the sale item detail page of the sale item B, the shopping server 1 does not transfer the information input into the title input area 202 and the body text input area 203 of the posting information input window 200-1. This is because it is assumed that the information input into the input area of the posting information input window 200-1 and the information input into the input area of the posting information input window 200-2 are different from each other. In the input area of the posting information input window 200-i, posting information related to a sale item whose information is published on the sale item detail page displayed along with the posting information input window 200-i is input from the user. Therefore, when the posting information input window 200-1 is displayed, positing information related to the sale item A is input. On the other hand, when the posting information input window 200-2 is displayed, positing information related to the sale item B is input. It is assumed that the sale item for which information is posted is different between the CGM site 1 and the CGM site 2, so that the information to be posted is also different. Therefore, if the input information is transferred, the user has to delete the transferred information from the input area, so that it takes more time. The reason why the shopping server 1 does not transfer the input information is to save such time.

2. Configuration of Shopping Server

Next, the configuration of the shopping server 1 will be described with reference to FIGS. 3 and 4.

Figure 3:
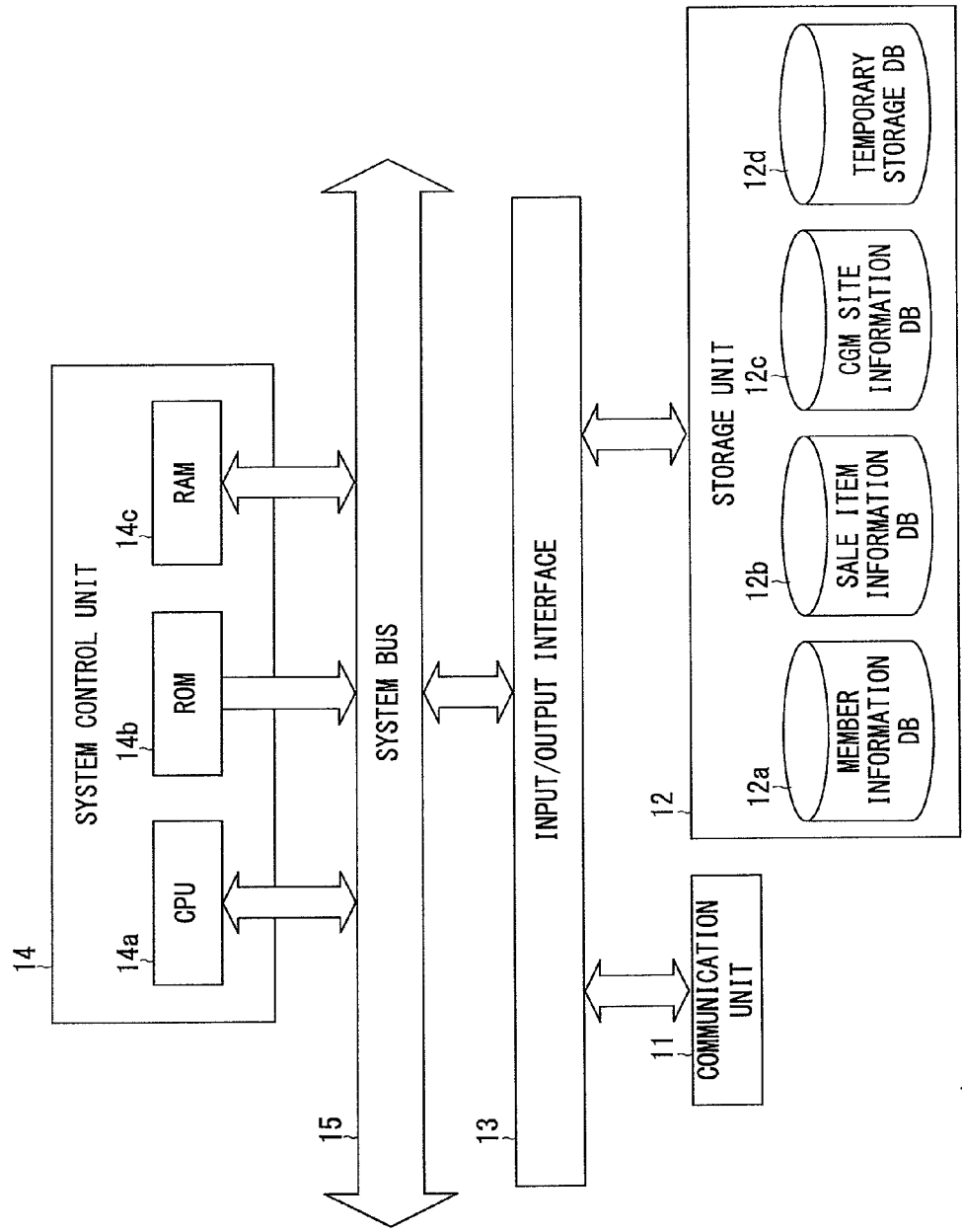
FIG. 3 is a block diagram showing an example of a schematic configuration of a shopping server 1 according to an embodiment.

FIG. 3 is a block diagram showing an example of a schematic configuration of the shopping server 1 according to the present embodiment. As shown in FIG. 3, the shopping server 1 includes a communication unit 11, a storage unit 12, an input/output interface 13, and a system control unit 14. The system control unit 14 and the input/output interface 13 are connected via a system bus 15.

The communication unit 11 connects to the network NW and controls communication states with the CGM servers 2-i, the user terminals 3, and the like.

The storage unit 12 (an example of storage means of the present invention) includes, for example, a hard disk drive. In the storage unit 12, a member information DB (database) 12a, a sale item information DB 12b, a CGM site information DB 12c, a temporary storage DB 12d, and the like are constructed.

FIG. 4A is a diagram showing an example of information registered in the member information DB 12a according to the present embodiment. In the member information DB 12a, member information related to users who register in the shopping site as members is registered. Specifically, in the member information DB 12a, a user ID which is identification information of a user, a password, a user name, a birth date, a gender, an address, a telephone number, an e-mail address, and the like are associated with each other and registered for each user.

FIG. 4B is a diagram showing an example of information registered in the sale item information DB 12b according to the present embodiment. In the sale item information DB 12b, sale item information related to sale items sold in the shopping site is registered. Specifically, in the sale item information DB 12b, a sale item ID (an example of identification information of the present invention) which is identification information of a sale item, a sale item name, a price, a normal URL of the sale item detail page, a short URL of the sale item detail page, a URL of a sale item image, an explanatory text of the sale item, and the like are associated with each other and registered for each sale item.

FIG. 4C is a diagram showing an example of information registered in the CGM site information DB 12c according to the present embodiment. In the CGM site information DB 12c, information related to the CGM sites i into which the shopping server 1 can post the posting information is registered. Specifically, in the CGM site information DB 12c, a site ID which is identification information of a CGM site i, a title input flag, the upper limit of the number of input characters, posting information input window data, and the like are associated with each other and registered for each CGM site i. The title input flag is flag information indicating whether or not the title is included as an item of the posting information of a corresponding CGM site i. When the title input flag is set to ON, the items of the posting information include the title. On the other hand, when the title input flag is set to OFF, the items of the posting information do not include the title. The upper limit of the number of input characters indicates the upper limit of the number of input characters of the posting information in the corresponding CGM site i.

The posting information input window data (an example of instruction information of the present invention) is information for the user terminal 3 to display the posting information input window 200-$i$ of a corresponding CGM site i. Specifically, the posting information input window data is information to instruct the user terminal 3 what posting information input window 200-$i$ should be displayed. For example, the posting information input window data is described in HTML. For example, when title is included as an item of the posting information of the CGM site i, for example, an input tag corresponding to the title input area 202 is included in the posting information input window data. The text which is input in the title input area 202 in advance is stored as a value attribute of the input tag. The posting information input window data includes, for example, a textarea tag corresponding to the body text input area 203. The text which is input in the body text input area 203 in advance is stored between the textarea start tag and end tag. The posting information input window data may be described, for example, in XML.

FIG. 4D is a diagram showing an example of information registered in the temporary storage DB 12$d$ according to the present embodiment. In the temporary storage DB 12$d$, information input into the input area in the posting information input window is temporarily registered. The shopping server 1 temporarily registers input information in the temporary storage DB 12$d$, so that the shopping server 1 transfers information input into the input area of the posting information input window 200-$i$ corresponding to a certain CGM site i to the input area of the posting information input window 200-$i$ corresponding to another certain CGM site i. In the temporary storage DB 12$d$, a user ID, a sale item ID, a title input text, a body input text, and the latest input time are stored in a record having the user ID and the sale item ID as keys and registered. The user ID is a user ID of a user who inputs information into the input area in the posting information input window. The sale item ID is a sale item ID of a sale item whose information is published on the sale item detail page displayed along with the input area of the posting information input window. The title input text (an example of character information of the present invention) is text data representing characters input into the title input area 202. The body input text (an example of character information of the present invention) is text data representing characters input into the body text input area 203.

The latest input time indicates a time when the user most recently performed an input operation on the title input area 202 or the body text input area 203. It is assumed that the user inputs characters in the input area in the posting information input window 200-$i$ corresponding to a certain CGM site i, and after a predetermined time period elapses, the user performs an operation to display the posting information input window 200-$i$ corresponding to another CGM site i. In this case, a long time has elapsed since the characters were most recently input, so that it can be considered that the user cancels the posting information input so far and the user posts new information to the other CGM site i. Therefore, the latest input time is set so that the shopping server 1 does not transfer the input information in such a case.

In the storage unit 12, various data, such as HTML (Hyper Text Markup Language) documents that constitute the Web pages of the shopping site, XML (eXtensible Markup Language) documents, image data, text data, and electronic documents, are stored.

Here, a script is described in an HTML document of each sale item detail page. The user terminal 3 performs processing related to posting of the posting information by executing the script. For example, when the posting information input icon 101-$i$ is selected by the user, the user terminal 3 transmits an input window display request (an example of request information of the present invention) indicating a request to display the posting information input window 200-$i$ to the shopping server 1. The user terminal 3 displays the posting information input window 200-$i$ based on the posting information input window data received from the shopping server 1. Every time the user inputs a character into the input area, the user terminal 3 transmits a temporary storage request indicating a request to cause the shopping server 1 to store the input character in the temporary storage DB 12$d$ to the shopping server 1.

In the storage unit 12, an operating system and a WWW (World Wide Web) server program are stored. Also in the storage unit 12, a shopping site management program (an example of an information processing program of the present invention) for the shopping server 1 to execute various processes related to the shopping site is stored. The shopping site management program may be acquired from another server apparatus or the like via the network NW or may be recorded in a recording medium such as a DVD (Digital Versatile Disc) and read from the recording medium via a drive apparatus.

The input/output interface 13 performs interface processing between the communication unit 11 and the storage unit 12, and the system control unit 14.

The system control unit 14 includes a CPU (Central Processing Unit) 14$a$, a ROM (Read Only Memory) 14$b$, a RAM (Random Access Memory) 14$c$, and the like. The CPU 14$a$ reads and executes the shopping site management program and the like, so that the system control unit 14 functions as a character information receiving means, a storage control means, a request information receiving means, a transmitting means, a first identification information receiving means, and a second identification information receiving means of the present invention.

The shopping server 1 may include a plurality of server apparatuses. For example, a server apparatus that performs processes related to electronic commerce, a server apparatus that transfers information input into the input area in the posting information input window 200-$i$ and performs processing for posting the posting information, a server apparatus that transmits the Web page of the shopping site according to a request from the user terminal 3, a server apparatus that manages various databases, and the like may be connected to each other via, for example, LAN (Local Area Network).

3. Operation of CGM System

Next, an operation of the CGM system S will be described with reference to FIGS. 5 to 8.

FIG. 5 is a sequence diagram showing a process example of the CGM system S according to the present embodiment. When the shopping server 1 receives a request of a sale item detail page from the user terminal 3, the shopping server 1 transmits an HTML document of the sale item detail page corresponding to the request to the user terminal 3 (step S1). Here, if URL included in the request is a short URL, the shopping server 1 searches for sale item information including the short URL from the sale item information DB 12b. Next, the shopping server 1 acquires a normal URL of the sale item information from the searched sale item information. Then, the shopping server 1 searches for an HTML document of the sale item detail page from a file system constructed in the storage unit 12 by the acquired URL.

The user terminal 3 displays the sale item detail page on a screen on the basis of the received HTML document (step S2). The user selects one of the posting information input icons 101-i displayed on the sale item detail page (step S3). Then, the user terminal 3 transmits an input window display request to the shopping server 1 (step S4). The input window display request includes a request user ID, a request sale item ID, and a request site ID. The request user ID is a user ID of a user who selects the posting information input icon 101-i. The request sale item ID is a sale item ID of a sale item corresponding to information displayed on the sale item detail page including the selected posting information input icon 101-i. The request site ID is a site ID of a CGM site i corresponding to the selected posting information input icon 101-i.

The shopping server 1, which receives the input window display request as the request information receiving means and the second identification information receiving means, performs processing to receive a permission to use the API of a CGM site i corresponding to the request site ID for a user corresponding to the request user ID by using OAuth. Operations of the shopping server 1, the CGM server 2-i, and the user terminal 3 to receive the permission to use the API by using OAuth are publicly known, so that the detailed description is omitted. The shopping server 1 may perform this processing only once for each combination of a user and a CGM site i.

Next, the shopping server 1 performs an input window display request reception process. In the input window display request reception process, the shopping server 1 acquires the posting information input window data corresponding to the request site ID from the storage unit 12 (step S5). Next, the shopping server 1 determines whether or not a record corresponding to the request user ID and the request sale item ID is registered in the temporary storage DB 12d (step S6). The record corresponding to the request user ID and the request sale item ID is referred to as a "record to be processed". At this time, if the shopping server 1 determines that the record to be processed is not registered in the temporary storage DB 12d (step S6: NO), the shopping server 1 creates the record to be processed in the temporary storage DB 12d (step S7). Next, the shopping server 1 transmits the acquired posting information input window data to the user terminal 3 (step S9).

On the other hand, if the shopping server 1 determines that the record to be processed is registered in the temporary storage DB 12d (step S6: YES), the shopping server 1 stores an input text stored in the record to be processed into the acquired posting information input window data so that the input text stored in the record to be processed is input into the input area in advance (step S8). Next, the shopping server 1 transmits the posting information input window data in which the input text is stored to the user terminal 3 as the transmitting means (step S9). The details of the input window display request reception process will be described later.

The user terminal 3, which receives the posting information input window data, displays the posting information input window on the screen on the basis of the posting information input window data (step S10). When the user performs an operation to display the posting information input window for the sale item displayed on the sale item detail page for the first time, nothing is displayed in the title input area 202. In the body text input area 203, only the tag of a link to the sale item detail page or the short URL is displayed. On the other hand, when the user has input information in the input area of the posting information input window 200-i different from a newly displayed posting information input window 200-i for the sale item displayed on the sale item detail page, the input information is displayed in the input area of the newly displayed posting information input window 200-i.

The user inputs one character in the input area 203 in the displayed posting information input window 200-i (step S11). Then, the user terminal 3 transmits a temporary storage request to the shopping server 1 (step S12). The temporary storage request includes a request user ID, a request sale item ID, a type of input item, an input code, and an input position. The request user ID is a user ID of a user who inputs the character. The request sale item ID is a sale item ID of a sale item corresponding to information displayed on the sale item detail page including the posting information input icon 101-i selected in step S3. The type of input item is information indicating the item in which the character is input. When the character is input into the title input area 202, the type of input item is set to "title". On the other hand, when the character is input into the body text input area 203, the type of input item is set to "body text". The input code (an example of character information of the present invention) is a character code representing the input character. The input position is a numerical value indicating the position at which the character is input in the input area.

The shopping server 1, which receives the temporary storage request as the character information receiving means and the first identification information receiving means, performs a temporary storage request reception process. In the temporary storage request reception process, the shopping server 1 adds the input code included in the temporary storage request to the input text in a record in the temporary storage DB 12d corresponding to the request user ID and the request sale item ID as the storage control means (step S13).

The processes from step S11 to step S13 are performed each time the user inputs a character. When the user performs an operation to delete a character from the input area, for example, the user terminal 3 transmits a temporary storage request including a control code indicating deletion as the input code. In this case, the shopping server 1 deletes a character code corresponding to the input position included in the temporary storage request from the record in the temporary storage DB 12d. The details of the temporary storage request reception process will be described later.

When the user completes a necessary input operation, the user selects the transmit button 204 (step S14). Then, the user terminal 3 transmits a posting request to the shopping server 1 (step S15). The posting request includes a user ID of a user who selects the transmit button 204, a sale item ID of the sale item whose information is displayed on the sale item detail page, a site ID of the CGM site i corresponding to the displayed posting information input window 200-i, and the input text input into the input area (the title input text and the body input text, or only the body input text).

The shopping server 1, which receives the posting request, performs a process to post the text input by the user as the posting information by using an API provided from the CGM server 2-i. Specifically, the shopping server 1 transmits a posting information registration request to the CGM server 2-i (step S16). The posting information registration request includes the input text included in the posting request, a token necessary to use an API, and the like.

The CGM server 2-*i*, which receives the posting information registration request, identifies the ID of the user who posts information in the CGM site i on the basis of the token and the like included in the posting information registration request. Then, the CGM server 2-*i* associates the input text included in the posting information registration request with the identified ID and registers the input text in a database included in the CGM server 2-*i* as the posting information (step S17). The CGM server 2-*i* generates a Web page, on which the information posted form the user is displayed, on the basis of the posting information registered in the database. When the registration is completed, the CGM server 2-*i* transmits a posting information registration completion response to the shopping server 1 (step S18).

The shopping server 1, which receives the posting information registration completion response, deletes the record to be processed corresponding to the user ID and the sale item ID included in the posting request received in step S15 from the temporary storage DB 12*d* (step S19). The record to be processed is deleted, so that the information which is once posted to one of the CGM sites i is not transferred to the input area in the posting information input window 200-*i* displayed thereafter. Here, the shopping server 1 does not necessarily have to delete the record to be processed. In this case, the posted information is transferred to the input area in the posting information input window 200-*i* displayed thereafter. Therefore, when the user posts the same information to a plurality of CGM sites i, it is possible to save the user the trouble of inputting the same information many times.

When the shopping server 1 deletes the record to be processed, the shopping server 1 transmits a posting completion response to the user terminal 3 (step S20). The user terminal 3, which receives the posting completion response, displays a message indicating that the posting is completed on the sale item detail page (step S21).

4. Operation of Shopping Server 1

Figure 6:
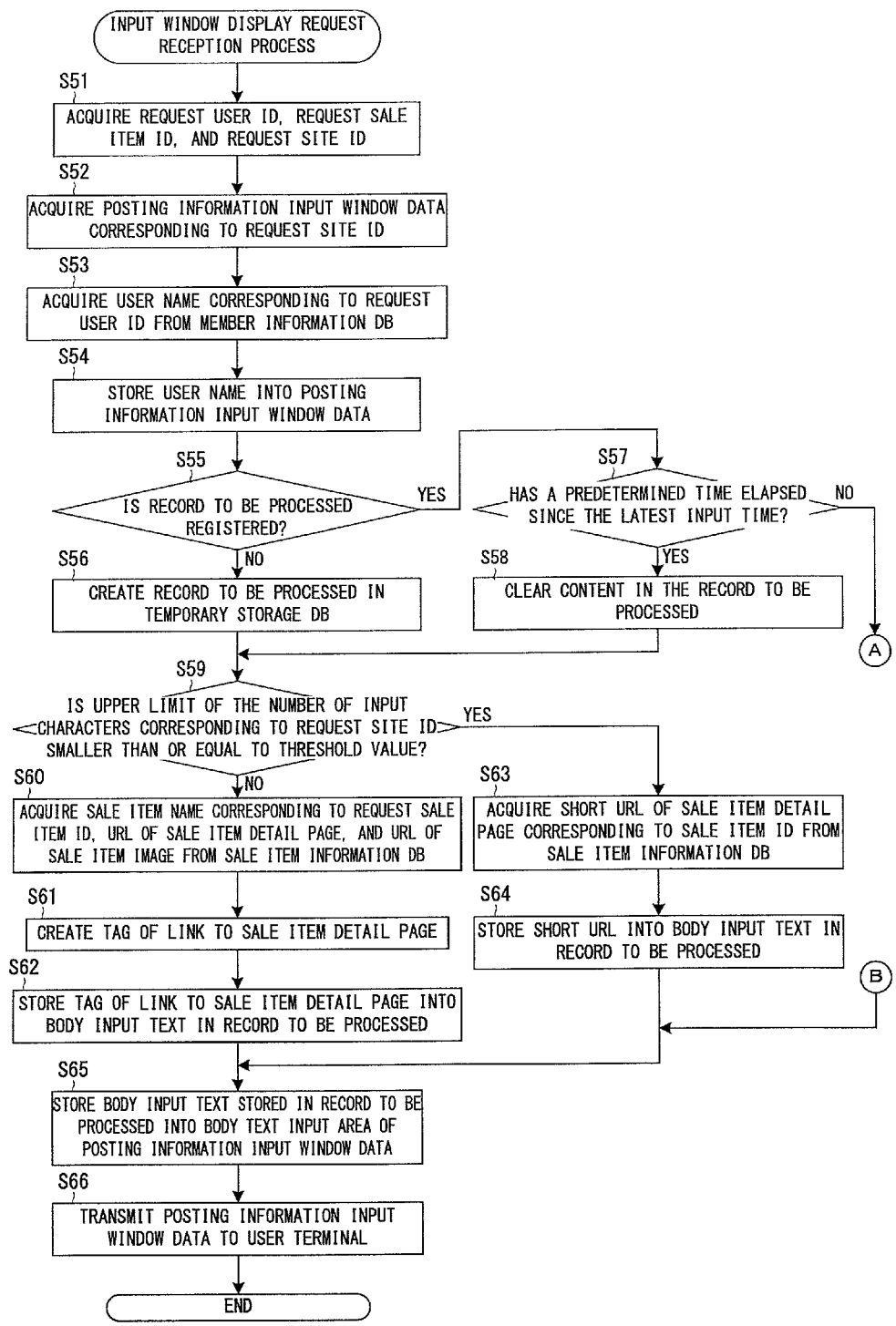
FIG. 6 is a flowchart showing a process example of an input window display request reception process of a system control unit 14 in the shopping server 1 according to an embodiment.
Figure 7:
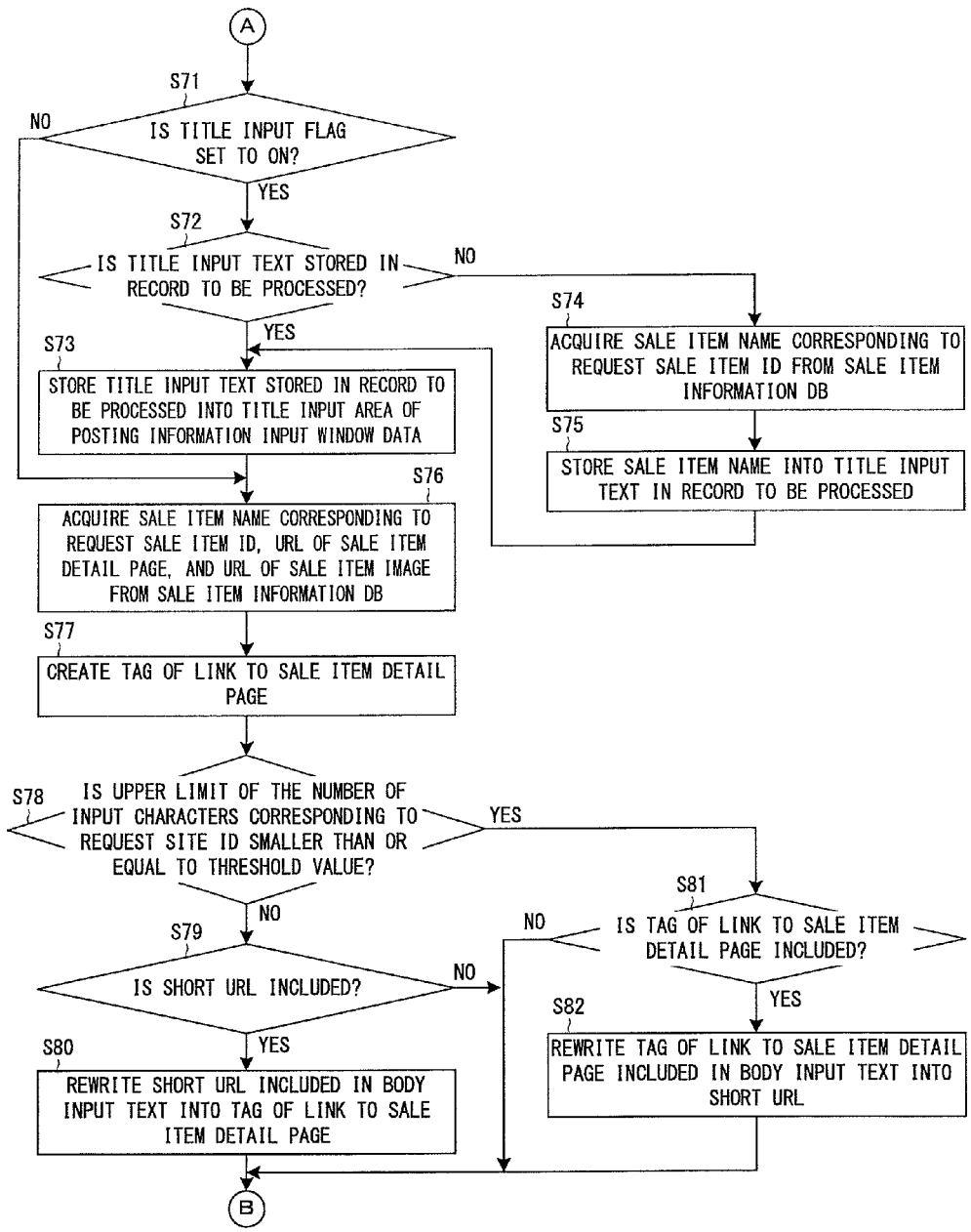
FIG. 7 is a flowchart showing a process example of the input window display request reception process of the system control unit 14 in the shopping server 1 according to an embodiment.

FIGS. 6 and 7 are flowcharts showing a process example of the input window display request reception process of the system control unit 14 in the shopping server 1 according to the present embodiment. First, as shown in FIG. 6, the system control unit 14 acquires the request user ID, the request sale item ID, and the request site ID from the input window display request received from the user terminal 3 (step S51). Next, the system control unit 14 acquires the posting information input window data corresponding to the request site ID from the CGM site information DB 12*c* (step S52). Next, the system control unit 14 acquires the user name corresponding to the request user ID from the member information DB 12*a* (step S53). Next, the system control unit 14 stores the acquired user name in the posting information input window data (step S54). The user name stored here is displayed in the posting information input window 200-*i* as the user name 201.

Next, the system control unit 14 determines whether or not the record to be processed, which is a record corresponding to the request user ID and the request sale item ID, is registered in the temporary storage DB 12*d* (step S55). At this time, if the system control unit 14 determines that the record to be processed is not registered in the temporary storage DB 12*d* (step S55: NO), the system control unit 14 creates the record to be processed in the temporary storage DB 12*d* (step S56). Then, the system control unit 14 stores the current time in the created record to be processed as the latest input time.

On the other hand, if the system control unit 14 determines that the record to be processed is registered in the temporary storage DB 12*d* (step S55: YES), the system control unit 14 determines whether or not a predetermined time has elapsed since the latest input time on the basis of the latest input time stored in the record to be processed and the current time (step S57).

At this time, if the system control unit 14 determines that the predetermined time has elapsed since the latest input time (step S57: YES), the system control unit 14 clears the content in the record to be processed (step S58). Specifically, the system control unit 14 stores the current time in the record to be processed as the latest input time. Further, the system control unit 14 deletes the title input text and the body input text from the record to be processed. The system control unit 14 performs this processing, so that the information input so far is not transferred to the input area in the posting information input window 200-*i* to be displayed by the user terminal 3. The system control unit 14 may perform processing to periodically delete a record, where a predetermined time has elapsed since the latest input time, from the temporary storage DB 12*d*. By such processing, it is also possible to prevent the information input so far from being transferred to the input area in the posting information input window 200-*i*. When performing this processing, the system control unit 14 need not perform the processes of steps S57 and S58.

When the system control unit 14 completes the process of step S56 or step S58, the system control unit 14 sets information input into the body text input area 203 in the posting information input window 200-*i* to be displayed by the user terminal 3. First, the system control unit 14 acquires the upper limit of the number of input characters corresponding to the request site ID from the CGM site information DB 12*c*. Then, the system control unit 14 determines whether or not the acquired upper limit of the number of input characters is smaller than or equal to a threshold value (step S59). At this time, if the system control unit 14 determines that the upper limit of the number of input characters is not smaller than or equal to the threshold value (step S59: NO), the system control unit 14 acquires the sale item name, the normal URL of the sale item detail page, and the URL of the sale item image corresponding to the request sale item ID from the sale item information DB 12*b* (step S60). Next, the system control unit 14 creates a tag of a link to the sale item detail page on the basis of the information acquired from the sale item information DB 12*b* (step S61). Next, the system control unit 14 stores the created tag in the record to be processed as the body input text (step S62). Next, the system control unit 14 proceeds to step S65.

On the other hand, if the system control unit 14 determines that the upper limit of the number of input characters is smaller than or equal to the threshold value (step S59: YES), the system control unit 14 acquires the short URL of the sale item detail page corresponding to the request sale item ID from the sale item information DB 12*b* (step S63). Next, the system control unit 14 stores the acquired short URL in the record to be processed as the body input text (step S64). Next, the system control unit 14 proceeds to step S65.

In step S65, the system control unit 14 stores the tag of a link to the sale item detail page or the short URL stored in the record to be processed as the body input text into the textarea tag of the body text input area 203 included in the acquired posting information input window data.

Next, the system control unit 14 transmits the posting information input window data in which necessary information is stored to the user terminal 3 which has transmitted the input window display request (step S66). When completing the process of step S66, the system control unit 14 completes the input window display request reception process.

In step S57, if the system control unit 14 determines that the predetermined time has not elapsed since the latest input time (step S57: NO), the system control unit 14 performs a process to transfer the information input so far to the input area in the posting information input window 200-*i* to be displayed by the user terminal 3.

As shown in FIG. 7, the system control unit 14 acquires the title input flag corresponding to the request site ID from the CGM site information DB 12*c*. Then, the system control unit 14 determines whether or not the acquired title input flag is set to ON (step S71). At this time, if the system control unit 14 determines that the title input flag is set to OFF (step S71: NO), the system control unit 14 proceeds to step S76.

On the other hand, if the system control unit 14 determines that the title input flag is set to ON (step S71: YES), the system control unit 14 sets input information in the title input area 202. Specifically, the system control unit 14 determines whether or not the title input text is stored in the record to be processed (step S72). At this time, if the system control unit 14 determines that the title input text is stored in the record to be processed (step S72: YES), the system control unit 14 acquires the title input text from the record to be processed. Then, the system control unit 14 stores the acquired title input text as the value attribute of the input tag of the title input area 202 included in the acquired posting information input window data (step S73).

On the other hand, if the system control unit 14 determines that the title input text is not stored in the record to be processed (step S72: NO), the system control unit 14 proceeds to step S74. The case where the record to be processed is registered in the temporary storage DB 12*d* (step S55: YES) and the title input text is not stored in the record to be processed is a case where the user performs a process to display any one of the posting information input windows 200-*i* but does not input anything in the title input area 202 in the displayed posting information input window 200-*i*. In this case, the system control unit 14 generates a state in which the sale item name is previously input in the title input area 202 in the posting information input window 200-*i* to be displayed by the user terminal 3. Specifically, the system control unit 14 acquires the sale item name corresponding to the request sale item ID from the sale item information DB 12*b* (step S74). Next, the system control unit 14 stores the acquired sale item name in the record to be processed as the title input text (step S75). Next, the system control unit 14 sets the sale item name stored in the record to be processed as the value attribute of the input tag of the title input area 202 included in the posting information input window data (step S73).

If the system control unit 14 determines that the title input flag is set to OFF (step S71: NO) in step S71 or when the system control unit 14 completes the process of step S73, the system control unit 14 sets input information in the body text input area 203. Here, the system control unit 14 converts the tag of a link to the sale item detail page or the short URL as needed.

Specifically, the system control unit 14 acquires the sale item name, the normal URL of the sale item detail page, the short URL of the sale item detail page, and the URL of the sale item image corresponding to the request sale item ID from the sale item information DB 12*b* (step S76). Next, the system control unit 14 creates a tag of a link to the sale item detail page on the basis of the acquired information (step S77). Next, the system control unit 14 acquires the upper limit of the number of input characters corresponding to the request site ID from the CGM site information DB 12*c*. Then, the system control unit 14 determines whether or not the acquired upper limit of the number of input characters is smaller than or equal to a threshold value (step S78).

At this time, if the system control unit 14 determines that the upper limit of the number of input characters is not smaller than or equal to the threshold value (step S78: NO), the system control unit 14 determines whether or not the short URL is included in the body input text stored in the record to be processed (step S79). At this time, if the system control unit 14 determines that the short URL is not included (step S79: NO), the system control unit 14 proceeds to step S65.

On the other hand, if the system control unit 14 determines that the short URL is included (step S79: YES), the system control unit 14 rewrites the short URL included in the body input text stored in the record to be processed into the tag of a link to the sale item detail page (step S80). Next, the system control unit 14 proceeds to step S65.

In step S78, if the system control unit 14 determines that the upper limit of the number of input characters is smaller than or equal to the threshold value (step S78: YES), the system control unit 14 determines whether or not the tag of a link to the sale item detail page is included in the body input text stored in the record to be processed (step S81). At this time, if the system control unit 14 determines that the tag of a link to the sale item detail page is not included (step S81: NO), the system control unit 14 proceeds to step S65.

On the other hand, if the system control unit 14 determines that the tag of a link to the sale item detail page is included (step S81: YES), the system control unit 14 rewrites the tag of a link to the sale item detail page included in the body input text stored in the record to be processed into the short URL (step S82). Next, the system control unit 14 proceeds to step S65.

In step S65, the system control unit 14 stores the body input text stored into the record to be processed in the textarea tag of the body text input area 203 included in the acquired posting information input window data. Next, the system control unit 14 transmits the posting information input window data in which necessary information is stored to the user terminal 3 (step S66). When completing the process of step S66, the system control unit 14 completes the input window display request reception process.

Figure 8:
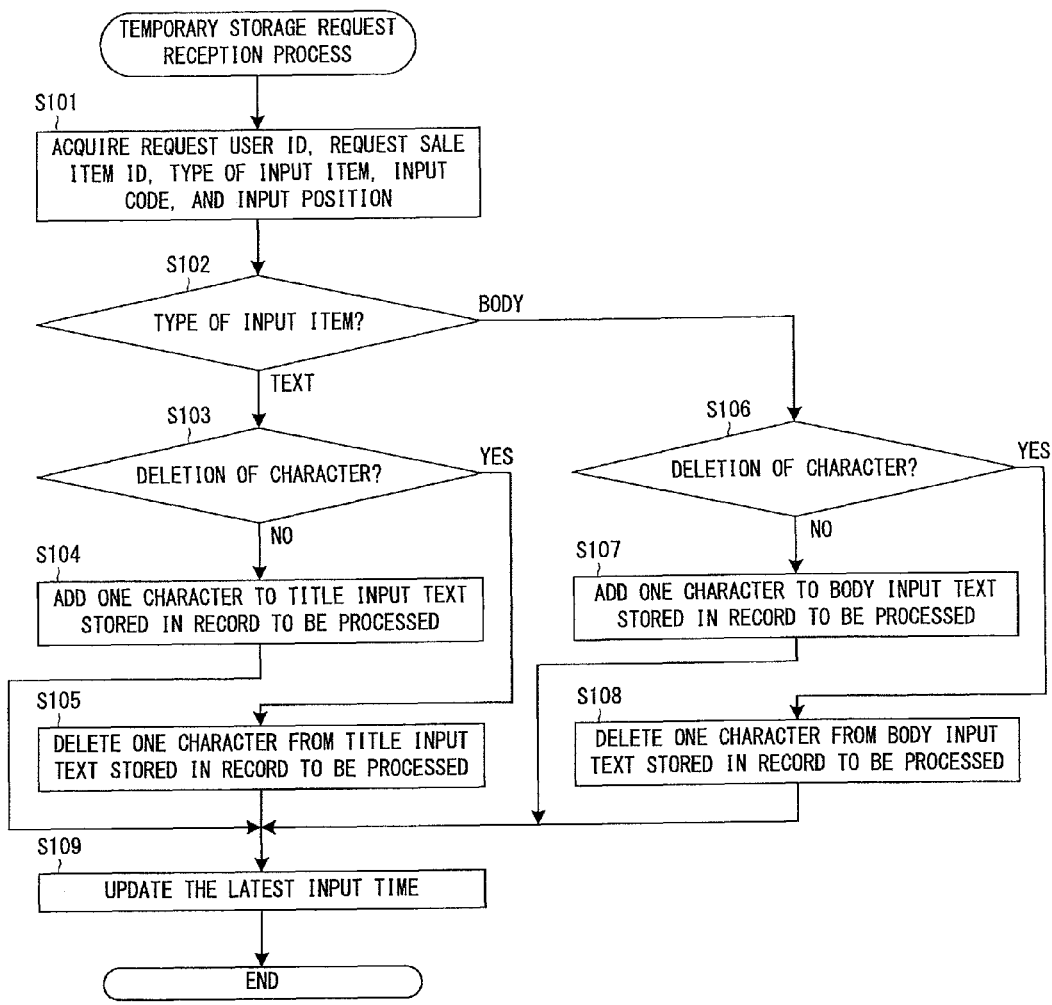
FIG. 8 is a flowchart showing a process example of a temporary storage request reception process of the system control unit 14 in the shopping server 1 according to an embodiment.

FIG. 8 is a flowchart showing a process example of the temporary storage request reception process of the system control unit 14 in the shopping server 1 according to the present embodiment. First, the system control unit 14 acquires the request user ID, the request sale item ID, the type of input item, the input code, and the input position from the temporary storage request received from the user terminal 3 (step S101).

Next, the system control unit 14 determines the type of input item (step S102). At this time, if the system control unit 14 determines that the type of input item is set to "title" (step S102: title), the system control unit 14 determines whether or not the input code is a control code indicating deletion (step S103). If the input code is not the control code indicating deletion, the input code is a character code representing a character newly input from the user. Therefore, if the system control unit 14 determines that the input code is not the control code indicating deletion (step S103: NO), the system control unit 14 adds the character code represented by the input code to the title input text stored in the record to be processed (step S104). Specifically, the system control unit 14 shifts backward character codes stored at or behind a position indicated by the input position in the title input text by one character. Next, the system control unit 14 stores the character code represented by the input code at the position indicated by the input position in the title input text.

On the other hand, if the input code is the control code indicating deletion, it indicates that the user has performed an operation to delete a character. Therefore, if the system control unit 14 determines that the input code is the control code indicating deletion (step S103: YES), the system control unit 14 deletes one character from the title input text stored in the record to be processed (step S105). Specifically, the system control unit 14 shifts forward the character codes stored behind the position indicated by the input position in the title input text by one character.

In step S102, if the system control unit 14 determines that the type of input item is set to "body text" (step S102: body text), the system control unit 14 determines whether or not the input code is a control code indicating deletion (step S106). At this time, if the system control unit 14 determines that the input code is not the control code indicating deletion (step S106: NO), the system control unit 14 adds the character code represented by the input code to the body input text stored in the record to be processed (step S107). On the other hand, if the system control unit 14 determines that the input code is the control code indicating deletion (step S106: YES), the system control unit 14 deletes one character from the body input text stored in the record to be processed (step S108).

When the system control unit 14 completes the process of step S104, S105, S107, or S108, the system control unit 14 updates the latest input time (step S109). Specifically, the system control unit 14 rewrites the time stored as the latest input time in the record to be processed into the current time. When completing the process of step S109, the system control unit 14 completes the temporary storage request reception process.

5. Example

Next, an example of the present embodiment will be described with reference to FIG. 9.

In the present example, it is assumed that there are CGM sites 1 to 3. The CGM site 1 is a blog site. Items of the posting information in the CGM site 1 include the title and the body text. The upper limit of the number of input characters in the CGM site 1 is 65535. The CGM site 2 is a mini-blog site. Item of the posting information in the CGM site 2 includes only the body text. The upper limit of the number of input characters in the CGM site 2 is 140. The CGM site 3 is an SNS site. Items of the posting information in the CGM site 3 include the title and the body text. The upper limit of the number of input characters in the CGM site 3 is 65535.

In the CGM site information DB 12c, information according to the items of the posting information and the upper limit of the number of input characters of each CGM site i is registered. The threshold value that is compared with the upper limit of the number of input characters is set to 200.

FIGS. 9A to 9E are screen display examples of the posting information input window 200-$i$ according to the present example.

It is assumed that a sale item detail page of a sale item A is displayed on a screen of a user terminal 3 used by a certain user X. Here, it is assumed that the user X performs an operation to display the posting information input window 200-$i$ for the sale item A for the first time. For example, it is assumed that the user X selects the posting information input icon 101-1. Then, the user terminal 3 transmits an input window display request including the user ID of the user X, the sale item ID of the sale item A, and the site ID of the CGM site 1 to the shopping server 1.

The shopping server 1, which receives the input window display request, performs a process to receive a permission for the user X to use the API of the CGM site 1 and performs the input window display request reception process. Here, in the temporary storage DB 12d, a record corresponding to the user ID of the user X and the sale item ID of the sale item A is not registered. Therefore, a record to be processed corresponding to the user ID of the user X and the sale item ID of the sale item A is created in the temporary storage DB 12d. The upper limit of the number of input characters in the CGM site 1 is greater than the threshold value. Therefore, a tag indicating a link to the sale item detail page of the sale item A is set as the body input text of the record to be processed. Further, the tag indicating a link to the sale item detail page of the sale item A is stored in the textarea tag in the body text input area 203. Then, the posting information input window data is transmitted from the shopping server 1 to the user terminal 3.

The user terminal 3 displays the posting information input window 200-1 as shown in FIG. 9A on the basis of the received posting information input window data. At this time, nothing is input in the title input area 202. In the body text input area 203, only the tag indicating a link to the sale item detail page is input. Here, it is assumed that the user X inputs a character string "I recommend sale item A" in the title input area 202 as shown in FIG. 9B. Further, it is assumed that the user X inputs a character string "The focal length of the sale item A is XXXX and" in the body text input area 203. Here, in the temporary storage DB 12d, the input character strings are additionally stored in the record corresponding to the user ID of the user X and the sale item ID of the sale item A.

Thereafter, it is assumed that the user X selects the posting information input icon 101-2 displayed on the sale item detail page. Then, the user terminal 3 transmits an input window display request including the user ID of the user X, the sale item ID of the sale item A, and the site ID of the CGM site 2 to the shopping server 1.

The shopping server 1, which receives the input window display request, performs a process to receive a permission for the user X to use the API of the CGM site 2 and performs the input window display request reception process. Here, in the temporary storage DB 12d, the record to be processed corresponding to the user ID of the user X and the sale item ID of the sale item A is registered. The items of the posting information of the CGM site 2 do not include a title. Therefore, only the body input text stored in the record to be processed is transferred. Here, the upper limit of the number of input characters in the CGM site 2 is smaller than or equal to the threshold value. Therefore, the tag indicating a link to the sale item detail page included in the body input text of the record to be processed is rewritten to the short URL. Next, the body input text of the record to be processed is stored in the textarea tag in the body text input area 203. Then, the posting information input window data is transmitted from the shopping server 1 to the user terminal 3.

The user terminal 3 displays the posting information input window 200-2 as shown in FIG. 9C on the basis of the received posting information input window data. At this time, the title input area 202 is not displayed. In the body text input area 203, the character string "The focal length of the sale item A is XXXX and" and the short URL of the sale item detail page of the sale item A are input in advance. Here, it is assumed that the user X additionally inputs a character string "it's a good bargain considering all that!" in the body text input area 203 as shown in FIG. 9D. Here, in the temporary storage DB 12d, the input character string is additionally stored in the record corresponding to the user ID of the user X and the sale item ID of the sale item A.

Thereafter, it is assumed that the user X selects the posting information input icon 101-3 displayed on the sale item detail page. Then, the user terminal 3 transmits an input window display request including the user ID of the user X, the sale item ID of the sale item A, and the site ID of the CGM site 3 to the shopping server 1.

The shopping server 1, which receives the input window display request, performs a process to receive a permission for the user X to use the API of the CGM site 3 and performs the input window display request reception process. The items of the posting information of the CGM site 3 include a title. Therefore, the title input text and the body input text stored in the record to be processed are transferred. Here, the upper limit of the number of input characters in the CGM site 3 is greater than the threshold value. Therefore, the short URL included in the body input text of the record to be processed is rewritten to the tag indicating a link to the sale item detail page. Next, the title input text of the record to be processed is stored as the value attribute of the input tag in the title input area 202. Further, the body input text of the record to be processed is stored in the textarea tag in the body text input area 203 and the posting information input window data is transmitted from the shopping server 1 to the user terminal 3.

The user terminal 3 displays the posting information input window 200-3 as shown in FIG. 9E on the basis of the received posting information input window data. Here, the character string "I recommend sale item A" is input in the title input area 202 in advance. In the body text input area 203, the character string "The focal length of the sale item A is XXXX and it's a good bargain considering all that!" and the tag indicating a link to the sale item detail page of the sale item A are input in advance. Here, the user X selects the transmit button 204. Then, the information input into the title input area 202 and the body text input area 203 of the posting information input window 200-3 is registered in a database included in the CGM server 2-3 as the posting information.

As described above, according to the present embodiment and the present example, every time the user inputs a character into the input area in the posting information input window 200-*i* when the posting information input window 200-*i* corresponding to any one of a plurality of CGM sites i that provide their respective CGM services is displayed, the system control unit 14 of the shopping server 1 receives a temporary storage request including a character code representing the input character from the user terminal 3, adds the character code included in the received temporary storage request to the input text stored in the record registered in the temporary storage DB 12*d*, receives an input window display request including a site ID different from the site ID of the CGM site corresponding to the posting information input window 200-*i* displayed by the user terminal 3, and transmits the posting information input window data, which corresponds to the site ID included in the received input window display request and which includes the input text stored in the record registered in the temporary storage DB 12*d* as an input text representing the characters previously input into the input area of the posting information input window 200-*i* to be displayed by the user terminal 3 on the basis of the posting information input window data, to the user terminal 3.

Therefore, it is possible to transfer the input information which the user intends to post to a certain CGM site to the input area in the posting information input window 200-*i* for posting information to another CGM site i.

Further, when the posting information input window 200-*i* is displayed by the user terminal 3, the system control unit 14 receives the temporary storage request including the sale item ID of the sale item whose information is displayed on the sale item detail page by the user terminal 3 and adds the character code included in the temporary storage request to the input text stored in the record corresponding to the sale item ID included in the temporary storage request among the records registered in the temporary storage DB 12*d*. Further, when the input window display request is transmitted from the user terminal 3, the system control unit 14 receives the input window display request including the sale item ID of the sale item whose information is displayed on the sale item detail page by the user terminal 3 and transmits the posting information input window data including the input text stored in the record corresponding to the sale item ID included in the input window display request among the records registered in the temporary storage DB 12*d* as an input text representing the characters previously input in the input area to the user terminal 3.

Therefore, it is possible not to transfer the input information when the user posts information related to a sale item which is different from a sale item for which the user intended to post information to a certain CGM site i, to another CGM site i.

In the above embodiment, the shopping server 1 transmits the posting information input window data which is data to display the posting information input window 200-*i* to the user terminal 3 as a response to the input window display request. However, the shopping server 1 may transmit, for example, the data to display the posting information input window 200-*i* to the user terminal 3 in advance. For example, the HTML document of the sale item detail page may include data to display the posting information input windows 200-*i* corresponding to each CGM site i. The shopping server 1 may instruct the user terminal 3 to display the posting information input window 200-*i* by, for example, transmitting an input text that will be previously input in the input area to the user terminal 3 as a response to the input window display request. In this case, the user terminal 3 displays the posting information input window 200-*i* based on the data received in advance and the input text received as a response to the input window display request.

In the above embodiment, every time the user inputs one character into the input area, a character code representing one character is transmitted from the user terminal 3 to the shopping server 1. However, for example, when a character string including a plurality of characters is input in a single input operation, a character code string representing the input character string may be transmitted to the shopping server 1. For example, when the user performs an operation to paste a character string which is copied in advance onto the input area, a plurality of characters are input in a single operation.

In the above embodiment, when information of one sale item is displayed on the Web page, the posting information input window 200-*i* for posting information for the sale item is displayed. However, when information of a plurality of sale items is displayed on the Web page, a posting information input window 200-*i* for posting information for a sale item selected from the plurality of sale items by the user may be displayed. For example, a corresponding posting information input icon display area 100 may be displayed on the Web page for each sale item.

For example, each posting information input icon 101-*i* may be displayed on the tool bar of the browser instead of on the Web page. For example, a tool bar program is embedded in the browser as an add-on in advance. When the user selects a posting information input icon 101-*i* on the tool bar, the user terminal 3 analyzes the HTML document of the currently displayed Web page by executing the tool bar program. Thereby, the user terminal 3 acquires the sale item ID of the sale item whose information is displayed on the Web page. Then, the user terminal 3 transmits an input window display request including the acquired sale item ID to the shopping server 1. If the user selects a posting information input icon 101-$i$ on the toolbar when information of a plurality of sale items is displayed on the Web page, the user terminal 3 may cause the user to select a sale item, for which the user posts information, from the plurality of sale items.

In the above embodiment, the thing in the present invention is applied to the sale item. However, the thing in the present invention may be applied to, for example, a predetermined service. Examples of the service include providing accommodations, providing a golf course, securing a seat in a transportation facility, and securing a seat in a performance hall. The thing in the present invention may be applied to a thing which is not an object of commerce. The thing in the present invention may be applied to an affair.

REFERENCE SIGNS LIST

1 Shopping server
2-$i$ CGM server
3 User terminal
11 Communication unit
12 Storage unit
12$a$ Member information DB
12$b$ Sale item information DB
12$c$ CGM site information DB
12$e$ Temporary storage DB
13 Input/output interface
14 System control unit
14$a$ CPU
14$b$ ROM
14$c$ RAM
15 System bus
NW Network
S CGM system

The invention claimed is:

1. A server apparatus to which a terminal apparatus that displays an input area, into which information to be posted to a service in which information posted from a user can be browsed by other users is input by characters, can be connected via a network, the server apparatus comprising:
 a character information receiving unit that receives character information indicating an input character from the terminal apparatus every time the user inputs the character into the input area when the input area corresponding to a first service which is one of a plurality of the services is displayed by the terminal apparatus;
 a storage control unit that stores the character information received by the character information receiving unit in a storage unit included in a server apparatus different from a server apparatus of the first service and different from a server apparatus of a second service which is one of the plurality of the services and is different from the first service;
 a request information receiving unit that receives request information indicating a request to display the input area corresponding to the second service from the terminal apparatus; and
 a transmitting unit that transmits instruction information, which indicates an instruction to display the input area corresponding to the request information received by the request information receiving unit and which includes the character information stored in the storage unit as character information indicating one or more characters previously input into the input area displayed by the terminal apparatus on the basis of the instruction information, to the terminal apparatus.

2. The server apparatus according to claim 1, further comprising:
 a first identification information receiving unit that receives identification information for identifying a thing corresponding to thing information which relates to one of a plurality things and which is displayed by the terminal apparatus when the input area corresponding to the first service is displayed; and
 a second identification information receiving unit that receives identification information for identifying a thing corresponding to the thing information, which is displayed by the terminal apparatus when the request information is transmitted from the terminal apparatus, from the terminal apparatus,
 wherein the storage unit associates the character information received by the character information receiving unit with the identification information received by the first identification information receiving unit and stores the character information in the storage unit, and
 the transmitting unit transmits the instruction information including the character information corresponding to the identification information received by the second identification information receiving unit to the terminal apparatus.

3. An information processing method in a server apparatus to which a terminal apparatus that displays an input area, into which information to be posted to a service in which information posted from a user can be browsed by other users is input by characters, can be connected via a network, the information processing method comprising:
 a character information receiving step of receiving character information indicating an input character from the terminal apparatus every time the user inputs the character into the input area when the input area corresponding to a first service which is one of a plurality of the services is displayed by the terminal apparatus;
 a storage step of storing the character information received in the character information receiving step in storage unit included in a server apparatus different from a server apparatus of the first service and different from a server apparatus of a second service which is one of the plurality of the services and is different from the first service;
 a request information receiving step of receiving request information indicating a request to display the input area corresponding to the second service from the terminal apparatus; and
 a transmitting step of transmitting instruction information, which indicates an instruction to display the input area corresponding to the request information received in the request information receiving step and which includes the character information stored in the storage unit as character information indicating one or more characters previously input into the input area displayed by the terminal apparatus on the basis of the instruction information, to the terminal apparatus.

4. A non-transitory recording medium that computer-readably stores an information processing program that causes a computer included in a server apparatus to which a terminal apparatus that displays an input area, into which information to be posted to a service in which information posted from a user can be browsed by other users is input by characters, can be connected via a network to function as:

character information receiving unit that receives character information indicating an input character from the terminal apparatus every time the user inputs the character into the input area when the input area corresponding to a first service which is one of a plurality of the services is displayed by the terminal apparatus;

storage control unit that stores the character information received by the character information receiving unit in storage unit included in a server apparatus different from a server apparatus of the first service and different from a server apparatus of a second service which is one of the plurality of the services and is different from the first service;

request information receiving unit that receives request information indicating a request to display the input area corresponding to the second service from the terminal apparatus; and transmitting unit that transmits instruction information, which indicates an instruction to display the input area corresponding to the request information received by the request information receiving unit and which includes the character information stored in the storage unit as character information indicating one or more characters previously input into the input area displayed by the terminal apparatus on the basis of the instruction information, to the terminal apparatus.

\* \* \* \* \*